United States Patent [19]

Simmons

[11] Patent Number: 4,795,221
[45] Date of Patent: Jan. 3, 1989

[54] CLEATS FOR SNOWMOBILE TRACK

[76] Inventor: Verlin M. Simmons, 495 S. Main, Providence, Utah 84332

[21] Appl. No.: 31,696

[22] Filed: Mar. 27, 1987

[51] Int. Cl.⁴ .......................................... B62D 55/205
[52] U.S. Cl. ................................ 305/35 EB; 305/39; 305/46
[58] Field of Search .................. 305/35 R, 35 EB, 39, 305/46, 54, 60

[56] References Cited

U.S. PATENT DOCUMENTS

| 2,992,862 | 7/1961 | Fredricks et al. | 305/54 X |
| 3,221,830 | 12/1965 | Walsh | 305/35 R X |
| 3,765,731 | 10/1973 | Kilbane, Jr. | 305/54 X |
| 3,782,787 | 1/1974 | Rubel et al. | 305/54 X |
| 3,865,441 | 2/1975 | Jolliffe | 305/54 |
| 4,035,035 | 7/1977 | Husted | 305/35 R X |
| 4,278,302 | 7/1981 | Westimayer et al. | 305/35 EB |

FOREIGN PATENT DOCUMENTS

| 1480845 | 10/1969 | Fed. Rep. of Germany | 305/54 |
| 711821 | 9/1931 | France | 305/54 |
| 40299 | 7/1965 | German Democratic Rep. | 305/35 EB |

Primary Examiner—Robert B. Reeves
Assistant Examiner—Russell D. Stormer
Attorney, Agent, or Firm—Thorpe, North & Western

[57] ABSTRACT

A track used to drive a snowmobile over a terrain comprises an endless drive belt having an outer surface which engages the terrain. A plurality of longitudinally spaced cleats are securely mounted on the outer surface of said drive belt, each of said cleats comprising a relatively narrow, elongate, essentially planar fin which extends transversely across at least a portion of the endless belt. The planar fin slants rearward of the direction of travel of the track as the track is driven in its normal operation of propelling the snowmobile forward over the terrain, such that the planar fin makes an acute, included angle with the surface of the track of between about 30 and 75 degrees. The track and the fins of the cleats cooperate to provide forward traction for the snowmobile while simultaneously providing lift to the track and the snowmobile to avoid the tendency of the snowmobile to dig into the terrain and bog down in the terrain.

8 Claims, 1 Drawing Sheet

CLEATS FOR SNOWMOBILE TRACK

BACKGROUND OF THE INVENTION

1. Field of the Invention

The present invention relates generally to endless traction belts or tracks used in driving snowmobiles. In particular, the present invention relates to improved cleats made of a flexible, resilient, elastomeric material and which when installed on the track of the snowmobile will greatly improve the ability of the track of the snowmobile to lift the track and the snowmobile upon snow and carry the snowmobile over the snow without bogging down in light or deep snow. The invention further relates to such improved cleats which will even allow the snowmobile to plane upon a water surface such as a lake or other substantially deep body of water.

2. State of the Art

Snowmobiles are used extensively in snowy regions, not only for everyday use, but they are also used widely for recreational and emergency purposes. Snowmobiles are operated on a wide variety of terrain. They are used in hilly or mountainous regions as well as on flat land. They are operated on fresh snow, on trails conditioned for snowmobile riding, on hard packed snow, on the icy surfaces of streams, rivers, and lakes, and on hard snow packed or icy roads. Recently, recreational use of snowmobiles has even extended to running the snowmobile on the surface of an unfrozen body of water such as a lake. In the latter use, the snowmobile must be kept up to a substantial speed in substantially a linear motion to keep the snowmobile on top of the water. If the velocity of the snowmobile drops or if the snowmobile is turned in its direction of travel, the track is no longer able to support the snowmobile on the water, and the snowmobile sinks in the water.

Continuous drive tracks are conventionally used for engaging the snow covered surface, the icy surface or the surface of a body of water in order to provide the propulsion to move the snowmobile forward. When the snowmobile is being used on snow or ice covered surfaces, the drive track must provide proper traction to propel the snowmobile forward. When the snowmobile is being operated on a water surface, the speed and rotation of the track provides a minimal degree of lift which is used in combination with lift inherent in the forward speed of the snowmobile to keep the snowmobile afloat on top of the surface of the body of water. In order to provide proper traction on snow and ice, as well as for uphill downhill and other conditions in which snowmobiles are used, the design of the track is very important. Generally speaking, the traction belt or track has a width substantially equal to the seat portion at the rear of the snowmobile. The track is drivably suspended on the frame of the snowmobile and is generally positioned at the rear portion of the snowmobile, while a pair of steerable skis support the front end of the snowmobile.

An example of a conventional track for a snowmobile is shown in U.S. Pat. No. 3,623,780. The track is generally made of an elastomeric material, with a plurality of transversely mounted and longitudinally spaced, rigid, elongate drive cleats being secured or mounted on the outside of the track. The drive cleats, which are conventionally U-shaped in cross-section, provide traction with the terrain in order to propel the snowmobile in a forward direction. Braking of the snowmobile is also accomplished utilizing the track. In braking, the track is slowed or stopped, and the cleats on the track then dig into the snow or ice on the ground to slow and stop the snowmobile.

Although there are enumerable snowmobiles in use, all of which utilize tracks having some type traction means such as the cleats mentioned above, the drive systems comprising such tracts are not without problems which can be irritable and downright troublesome to the snowmobiler. When the snowmobile is bucking deep snow, attempting to climb hills, breaking a new trail through snow, or is being operated in numerous other modes involving high load conditions wherein traction is of great importance, the traction means, such as the cleats mentioned above, have a universal tendency to dig deeply into the snow and ultimately bog the snowmobile down in the snow. Heretofore, there has been no provision by which the track could be designed to provide necessary traction while at the same time providing lift for the track and the snowmobile to keep the track from digging deep into the snow and bogging the snowmobile down.

In U.S. Pat. No. 4,175,627, there is disclosed a lightweight propulsion system for a power driven ski device in which a continuous drive track is provided. The drive track is relatively small and lightweight, with the drive track having a width which is approximately only that of a ski. The drive track comprises resilient cleats which extent transversely across the width of the track and are spaced along the circumferential length of the track. The cleats comprise substantially flat fins which are angled with respect to the outer, longitudinal surface of the track, with the flat cleats making an acute angle with the surface of the track such that the cleats slant forward in a direction of travel of the track as the track is driven in its normal operation of propelling the power driven ski device forward. The cleats, slanting forwardly in the direction of travel of the track, dig downwardly into the snow to provide traction for the otherwise lightweight, power driven ski device. However, if such forward slanting cleats were used on a relatively heavy weight snowmobile, the track would quickly dig itself deeply into the snow and completely bog the snowmobile down.

3. Objectives

A principal objective of the invention is to provide a novel, resilient, flexible cleat which is readily attached to the outer surface of an endless traction belt or track used in driving snowmobiles, with the flexible cleat comprising a relatively narrow, elongate, essentially planar strip of resilient material which extends transversely across the track of the snowmobile and is oriented such that the planar strip slopes from the surface of the track at an acute angle in the opposite direction of the travel of the track as the track propels the snowmobile forwardly.

A particular objective of the present invention is to provide a plurality of such resilient, flexible cleats attached to and spaced about the length of the track of a snowmobile, whereby such track not only exhibits exceptional traction but also develops an unexpected lift which pulls the track and the snowmobile upwardly and over the surface of snow or even water when the snowmobile is being operated on such surface.

Another objective of the present invention is to provide inexpensive, resilient, flexible cleats which can be quickly and easily installed on essentially all conventional tracks used in propelling snowmobiles to increase the effective traction of such tracks and in addition to provide such tracks with a completely unexpected lift characteristic in combination with the increased traction.

BRIEF DESCRIPTION OF THE INVENTION

The above objectives are achieved in accordance with the present invention by providing novel, unique cleats made of a resilient, flexible material, wherein the cleats are adapted to be quickly and easily attached to the outer surface of endless traction belts or tracks used in propelling a snowmobile. The cleats comprise relatively narrow, elongate, essentially planar strips, slats or fins which are attached to the outer surface of the snowmobile track. The cleats extends transversely across at least a portion of the width of the track, and a plurality of cleats are preferably used for each track, with the cleats being spaced along the circumferential length of the track. The planar slats or fins of the cleats are angled with respect to the outer, longitudinal and circumferential surface of the track, with the planar slats or fins making an acute angle with the outer surface of the track such that the planar slats or fins slant rearward of the direction of travel of the track as the track is driven in its normal operation of propelling the snowmobile forward. The slats or fins preferably slant backwardly or rearwardly of the travel of the track, making an acute, included angle with the surface of the track of between about 30 and 75 degrees, most preferably between about 50 and 70 degrees.

Means are provided for attaching the cleats to the track of the snowmobile. In the preferred embodiment, a flange is provided along the upper elongate side edge of each of the slats or fins comprising the cleats. The flange is preferably formed integrally with the slat or fin of the cleat. Advantageously, the flange and the slat or fin are molded integrally from an elastomeric polymer which is both resilient and flexible. The flange and the slat or fin together form the cleat of the present invention. When installed on the track of a snowmobile, the flange of the cleat extends from the mutually corresponding slat or fin in a direction of the forward movement of the track. The flange lies flatwise on the outer surface of the track and is firmly attached to the track by appropriate fastening means. The included angle between the flange and the slat or fin of the cleat is between about 105 and 165 degrees and more preferably between about 110 and 145 degrees.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

The novel cleats of the present invention and the improved endless traction belt or track incorporating the novel cleats are advantageously used in combination with any of the numerous snowmobiles as disclosed in the prior art as well as commercially available in the marketplace. A typical snowmobile comprises an elongated main body portion having a passenger-carrying seat mounted on the rear portion thereof and a front body portion comprising a hood or housing with a drive motor mounted therein. The front body portion is supported at least in part by a pair of skis in a conventional manner. The skis are suitably mounted to the snowmobile for pivotable movement, with the skis further being operatively connected to a handle bar which is used by the operator of the snowmobile to move the skis and guide the snowmobile.

An endless traction belt or track is supported by an appropriate suspension system which is in turn associated with the main body portion of the snowmobile. The track is driven by means of a transmission system coupled between the drive motor and the track. The front and rear body portions, drive motor, skis, suspension system and transmission system of a snowmobile are well known in the prior art and will not be described in detail here. In fact, the foregoing, brief description of a snowmobile is intended to provide general information only about the basic construction of a snowmobile.

As mentioned previously, a principal objective of the present invention is to provide a novel, resilient, flexible cleat which is readily attached to the outer surface of an endless traction belt or track used in driving snowmobiles. The cleats can either be installed on an existing track, or the cleats can be incorporated into the track as an integral part of the track during the manufacture of the track. Thus, the invention encompasses the new novel cleats as well as the new novel tracks on which the cleats are installed.

Figure 1:
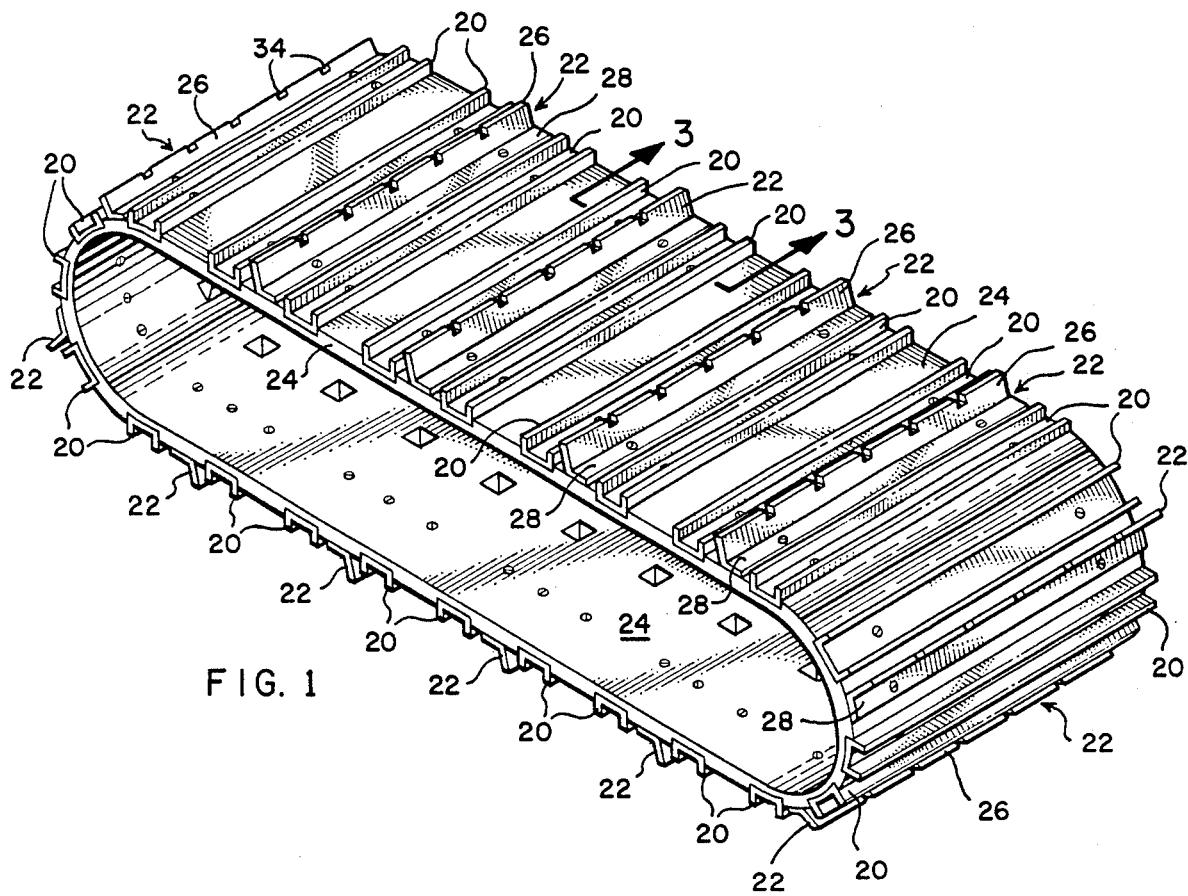
FIG. 1 is pictorial representation of a snowmobile track in accordance with the present invention, wherein the track includes a plurality of resilient, flexible cleats of the present invention attached to the outer surface of the track.
Figure 2:
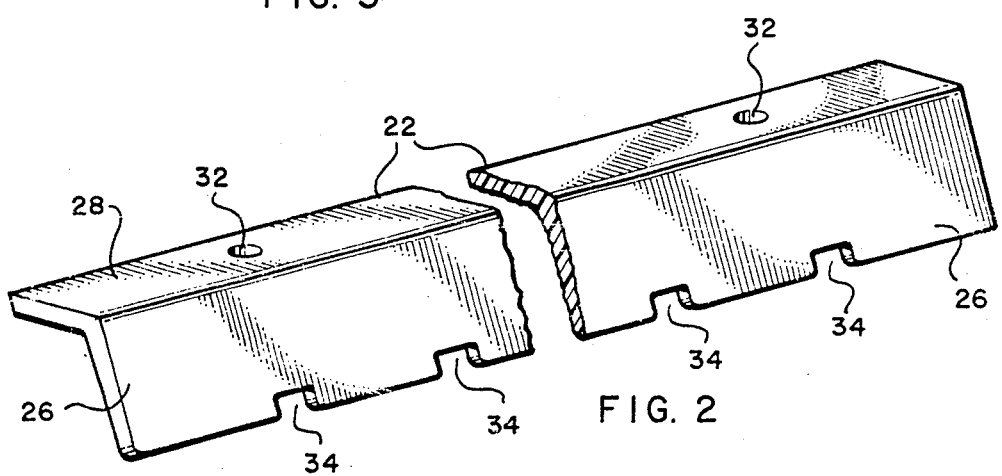
FIG. 2 is a pictorial representation of a preferred embodiment of a resilient, flexible cleat in accordance with the invention.

A track 24 in accordance with the present invention is shown in FIGS. 1 and 2. As illustrated, the track 24 is of the type comprising a single piece, endless belt formed of a resilient rubber-like material as is well known in the art. The track 24 could just as well be formed of several narrower belts which are held together in alignment to form the broader track. A track of the latter type is shown and described in U.S. Pat. No. 3,390,689. In the latter type belt, the multiple, narrower belts are usually held together by a plurality of transverse cleats. Even in single piece tracks 24 such as illustrated in FIGS. 1 and 2 of the accompanying drawings, it is customary to provide the transverse cleats. These customary cleats are shown by the reference number 20 in the accompanying drawings.

In accordance with one embodiment of the present invention, the customary cleats 20 could be replaced entirely by the new, improved cleats of the present invention. Such an embodiment would be advantageous in the initial manufacture of the tracks. However, it has also been found to be highly advantageous to install or retrofit existing tracks, i.e. tracks which have been manufactured with the customary cleats as a part thereof, with a plurality of the cleats of the present invention, while leaving the existing, customary cleats in place. The track 24 shown in FIGS. 1 and 2 of the accompanying drawings is of this latter type. Although a track which incorporates only the new cleats of the present invention is not illustrated in the accompanying drawings, it is to be recognized that such a track is fully within the scope of the present invention.

As illustrated, the existing track 24 may comprise a plurality of the customary cleats 20 extending thereacross. The customary cleats 20 and have a generally u-shaped cross-section. The legs of the u-shaped members extend away from the surface of the track 24 so as to engage the surface over which the snowmobile is being operated. In accordance with the illustrated embodiment of the present invention, a plurality of new, improved cleats 22 are installed on the track 24, with the new cleats 20 extending transversely across at least a portion of the width of the track 24 at positions between adjacent, customary cleats 20. It has been found that the new cleats 22 need not be installed between each of the adjacent cleats 20. As few as 8 to 12 of the new cleats 22 can be spaced about the track 24. As illustrated in FIG. 1 of the accompanying drawings, a new cleat 22 is installed between pairs of customary cleats 20 such that there are twice as many customary cleats 20 on the track 24 as there are new cleats 22. The new cleats 22 could be installed between every third or fourth of the customary cleats 20 so as to reduce the number of new cleats even further. As stated above, only 8 to 12 of the new cleats 22 are necessary to achieve the remarkable results of the present invention.

Figure 3:
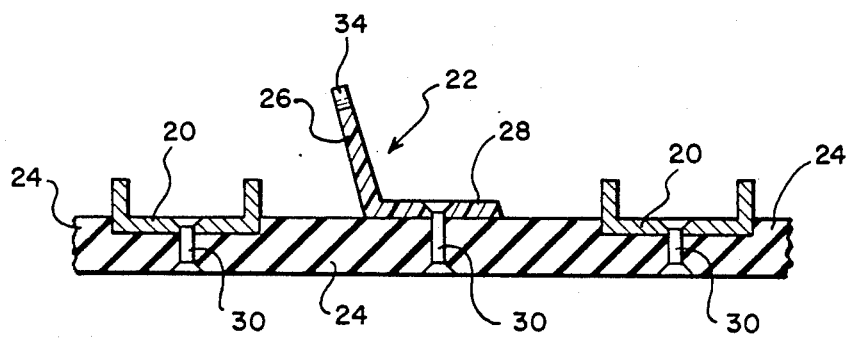
FIG. 3 is a cross-sectional view of the track and cleat member of the present invention as taken along line 3—3 of FIG. 1 showing one means of attaching the cleat member to the track.

A preferred form of the new, improved cleat 22 in accordance with the present invention is shown by itself in FIG. 2 and installed on the track 24 in FIGS. 1 and 3. The new, improved cleats comprise relatively narrow, elongate essentially planar strips, slats or fins 26. The fins 26 are attached to the outer surface of the snowmobile track 24, with the fins 26 extending transversely across at least a portion of the width of the track 24. The planar fins 26 of the cleats 22 are angled with respect to the outer surface of the track 24. The fins 26 make an acute angle with the outer surface of the track 24 so that the fins 26 slant rearward of the direction of travel of the track 24 as the track 24 is driven in its normal operation of propelling the snowmobile in a forward direction. The fins 26 preferably slant backwardly or rearwardly of the travel of the track 24, making an acute, included angle with the surface of the track 24 of between about 30 and 75 degrees, most preferably between about 50 and 70 degrees. As can be seen from the orientation of the fins 26 in FIG. 1, the track 24 as depicted in FIG. 1 is adapted to travel in a clockwise rotation.

As shown in FIG. 3 of the accompanying drawings, the new, improved cleat comprises a relatively narrow, elongate, essentially planar flange 28 which is formed along the upper elongate side edge of the fin 26. The flange 28 is preferably formed integrally with the fin 26. The new cleat 22 is made of a resilient material with the cleat 22 preferably being molded from an elastomeric polymer which is both resilient and flexible. Advantageously, the new cleat 22 is molded from a polyurethane material. The flange 28 and the fin 26 of the new cleat 22 are oriented with respect to each other so as to form an included angle of between about 105 and 165 degrees. Preferably, the included angle between the flange 28 and fin 26 of the cleat 22 is between about 110 and 145 degrees. The width of the fin 26 and the flange 28 is advantageously between about 2.5 and 5 centimeters.

The flange 28 comprises means for attaching the cleats 22 to the track 24. The flange 28 is made to lie flatwise on the outer surface of the track 24 and is firmly attached to the track 24 by appropriate fastening means such as rivets 30 as shown in FIG. 3. For this purpose, spaced openings 32 are provided in the flange 28 to accept the rivets 30. It is well known in the art to use rivets 30 or other fastening means to attach the customary cleats 20 to the track, and further description of such fastening means is not deemed necessary. When installed on the track 24, the flange 28 extends from the mutually corresponding fin 26 in a direction of the forward movement of the track 24 so that the fin 26 will make its appropriately slanted angle with the surface of the track 24.

In a preferred embodiment of the cleat 22 of the present invention as illustrated in FIG. 2 of the accompanying drawings, the fin 26 is tapered inwardly in a direction towards its free edge, i.e., the edge thereof which is not connected to the flange 28. In other words, the thickness of depth of the planar fin 26 gradually decreases as the fin 26 extends from the flange 28, This tapering of the fin 26 allows the free edge portion thereof to flex and readily adjust itself to objects and bumps in the surface over which the snowmobile is being operated. This flexure allows the free edge of the cleat 22 to bend when an object or bump is encountered so as to yield rather than to break or tear the edge of the cleat 22. Because the cleat 22 is made of a resilient, flexible material, the fin 26 thereof is adapted to bend and yield even if the thickness thereof is not tapered. However, tapering of the fin 26 enhances its characteristic to yield and bend rather than to break or tear when an obstacle or bump is encountered.

The free edge of the fin 26 of the cleat 22 can also be provided with a series of indentations of cutouts 34. The cutouts tend to improve the traction of the cleats 22 when the snowmobile is being driven over hard packed snow or ice. It should be recognized, however, that the tapering of the fin 26 and the provision of cutouts 34 in the free edge thereof are not essential but rather discretionary in character.

Although preferred embodiments of the cleat 22 and track 24 of the present invention have been illustrated and described, it is to be understood that the present disclosure is made by way of example and that various other embodiments are possible without departing from the subject matter coming within the scope of the following claims, which subject matter is regarded as the invention.

I claim:

1. A track used to drive a snowmobile over a terrain, said track comprising in combination:
   an endless drive belt having an outer surface which engages the terrain;
   a plurality of longitudinally spaced cleats securely mounted on the outer surface of said drive belt, each of said cleats comprising a relatively narrow, elongate, essentially planar fin, each of said cleats extending transversely across at least a portion of the endless belt with said planar fin thereof angled rearward of the rotation of the track as the track is driven in its normal operation of propelling the snowmobile forward over the terrain, such that said planar fin makes an acute, include angle with the surface of the track of between substantially 30 and 75 degrees;

whereby the track and the fins of said cleats cooperate to provide forward traction for said snowmobile while simultaneously providing lift to the track and the snowmobile to avoid the tendency of the snowmobile to dig into the terrain and bog down in the terrain.

2. A track in accordance with claim 1, wherein the cleats extend across essentially the fully width of the track, and there are at least about 8 cleats equally spaced along the track.

3. A track in accordance with claim 1, wherein the fins of said cleats are made of a resilient, flexible material.

4. A track in accordance with claim 1, wherein each fin makes an acute, included angle with the surface of the track of between substantially 50 and 70 degrees.

5. A track in accordance with claim 1, wherein said cleat further comprises:

a relatively narrow, elongate, essentially planar flange extending along an elongate side edge of said fin, with the flange making an included angle with the fin of between substantially 105 and 165 degrees; and means for mounting said flange flatwise on the outer surface of the track such that the fin extends in its angled orientation from the outer surface of said track.

6. A track in accordance with claim 5, wherein the included angle between the flange and the fin is between substantially 110 and 145 degrees.

7. A track in accordance with claim 5, wherein the fin and the flange are molded integrally from a resilient, flexible material.

8. A track in accordance with claim 5, wherein the means for mounting said flange on the outer surface of the track comprises attachment means extending through the flange to the track to firmly secure the flange to the outer surface of the track.

* * * * *